US010942307B2

(12) United States Patent
Li et al.

(10) Patent No.: US 10,942,307 B2
(45) Date of Patent: Mar. 9, 2021

(54) BAR COLLIMATOR, BACKLIGHT SYSTEM AND METHOD

(71) Applicant: LEIA INC., Menlo Park, CA (US)

(72) Inventors: Xuejian Li, Menlo Park, CA (US); Ming Ma, Palo Alto, CA (US); David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 129 days.

(21) Appl. No.: 16/253,160

(22) Filed: Jan. 21, 2019

(65) Prior Publication Data

US 2019/0196091 A1 Jun. 27, 2019

Related U.S. Application Data

(63) Continuation of application No. PCT/US2016/044124, filed on Jul. 26, 2016.

(51) Int. Cl.
F21V 8/00 (2006.01)

(52) U.S. Cl.
CPC ........... *G02B 6/0038* (2013.01); *G02B 6/003* (2013.01); *G02B 6/005* (2013.01); *G02B 6/0028* (2013.01)

(58) Field of Classification Search
CPC .... G02B 6/0038; G02B 6/0028; G02B 6/003; G02B 6/005; G02B 6/002; G02B 6/10
See application file for complete search history.

(56) References Cited

U.S. PATENT DOCUMENTS

| 6,011,602 A | * | 1/2000 | Miyashita | ............ G02B 6/0038 349/65 |
| 7,527,412 B2 | | 5/2009 | Lee et al. | |
| 8,384,861 B2 | | 2/2013 | Jepsen | |

(Continued)

FOREIGN PATENT DOCUMENTS

| CN | 102588845 B | 7/2012 |
| CN | 203799043 U | 8/2014 |

(Continued)

OTHER PUBLICATIONS

International Search Report and Written Opinion (ISRWO) by International Searching Authority (ISA) Korean Intellectual Property Office (KIPO) dated Mar. 31, 2017 (13 pages) for counterpart PCT Application PCT/US2016/044124.

(Continued)

*Primary Examiner* — Evan P Dzierzynski
(74) *Attorney, Agent, or Firm* — J. Michael Johnson

(57) ABSTRACT

A bar collimator and a backlight system employ diffractive coupling to provide a collimated source of illumination to a backlight. The bar collimator includes a light guide and a diffraction grating disposed on a side of the light guide. The light guide is configured to guide light received from a light source as guided light. The diffraction grating is configured to diffractively couple out a portion of the guided light and to direct the diffractively coupled-out portion toward an input of a backlight as a collimated light having an extent (Continued)

corresponding to a length of the backlight input. A backlight system includes the bar collimator and further includes a light source and a backlight adjacent to the light guide of the bar collimator, the backlight being configured to receive collimated light from a diffraction grating of the bar collimator.

20 Claims, 7 Drawing Sheets

(56) References Cited

U.S. PATENT DOCUMENTS

| | | | |
|---|---|---|---|
| 9,128,226 B2 | 9/2015 | Fattal et al. | |
| 9,201,270 B2 | 12/2015 | Fattal et al. | |
| 9,298,168 B2 | 3/2016 | Taff et al. | |
| 9,389,415 B2 | 7/2016 | Fattal et al. | |
| 9,459,461 B2 | 10/2016 | Santori et al. | |
| 9,557,466 B2 | 1/2017 | Fattal | |
| 9,785,119 B2 | 10/2017 | Taff et al. | |
| 2005/0201122 A1 | 9/2005 | Shinohara et al. | |
| 2008/0266863 A1 | 10/2008 | Rinko | |
| 2008/0297696 A1 | 12/2008 | Banerjee | |
| 2011/0002143 A1 | 1/2011 | Saarikko et al. | |
| 2011/0051460 A1 | 3/2011 | Montgomery et al. | |
| 2011/0141395 A1 | 6/2011 | Yashiro | |
| 2011/0141765 A1 | 6/2011 | Chang et al. | |
| 2012/0127751 A1 | 5/2012 | Kimmel | |
| 2013/0107569 A1* | 5/2013 | Suganuma | G02B 6/0038 362/607 |
| 2014/0022814 A1* | 1/2014 | Kurata | G02B 6/0038 362/606 |
| 2014/0268867 A1 | 9/2014 | Fiorentino et al. | |
| 2015/0036068 A1 | 2/2015 | Fattal et al. | |
| 2016/0161659 A1* | 6/2016 | Minami | G02B 6/0025 362/609 |
| 2016/0202594 A1 | 7/2016 | Kim et al. | |
| 2017/0299794 A1 | 10/2017 | Fattal | |
| 2018/0164489 A1 | 6/2018 | Fattal et al. | |
| 2018/0164490 A1 | 6/2018 | Ma et al. | |
| 2018/0299608 A1 | 10/2018 | Fattal et al. | |

FOREIGN PATENT DOCUMENTS

| | | |
|---|---|---|
| JP | 2003115209 A | 4/2003 |
| JP | 2009015303 A | 1/2009 |
| KR | 20160087185 A | 7/2016 |
| TW | 201619672 A | 6/2016 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

* cited by examiner

BAR COLLIMATOR, BACKLIGHT SYSTEM AND METHOD

CROSS-REFERENCE TO RELATED APPLICATIONS

This application is a continuation patent application of and claims the benefit of priority to International Application No. PCT/US2016/044124, filed Jul. 26, 2016, the entirety of which is incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Among the most commonly found electronic displays are the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome various potential applicability limitations of passive displays associated with light emission, many passive displays are coupled to an external light source. The coupled light source may allow these otherwise passive displays to emit light and function substantially as an active display. Examples of such coupled light sources are backlights.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1:
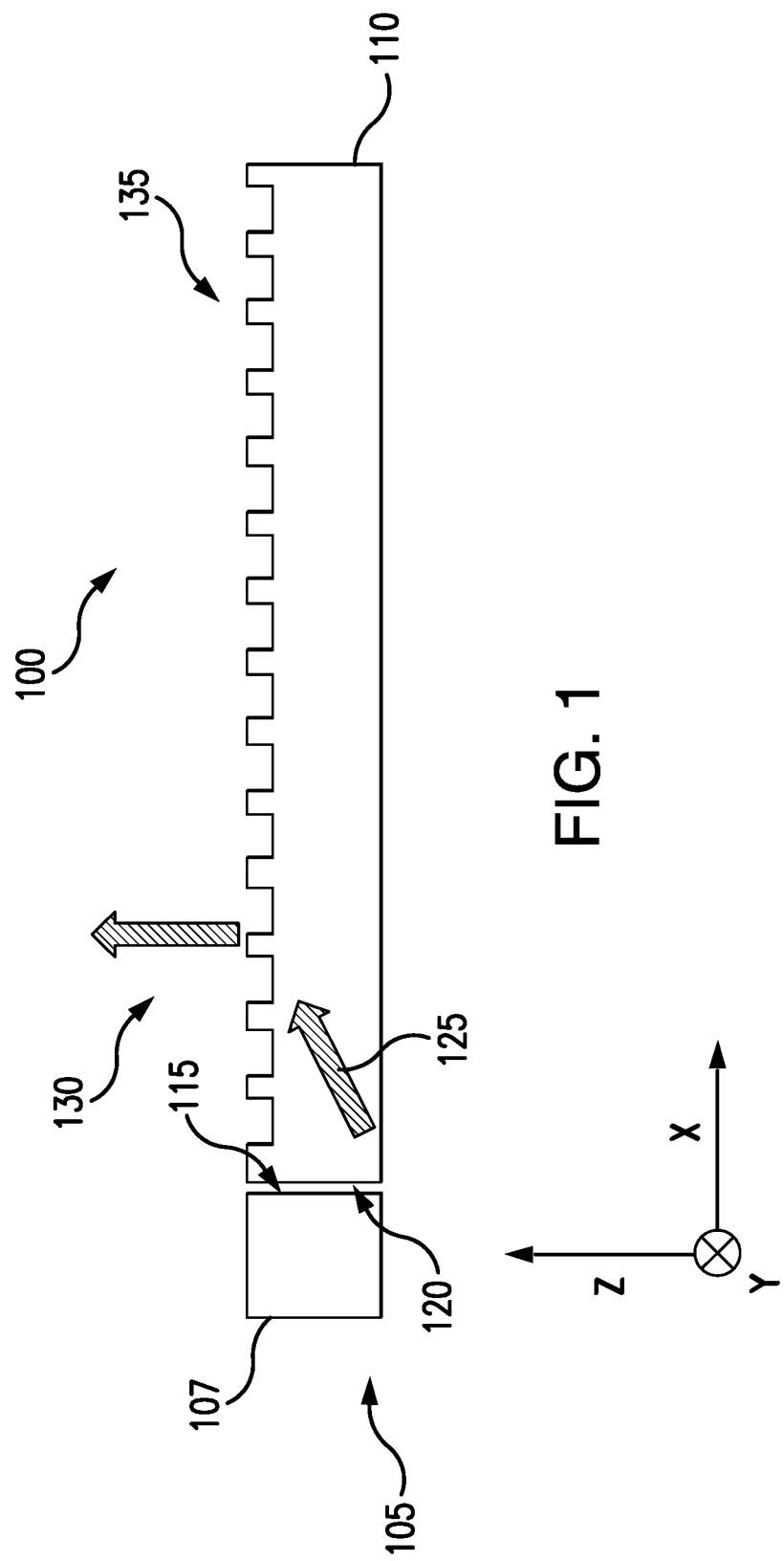
FIG. 1 illustrates a side view schematic diagram of a backlight system in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Embodiments in accordance with the principles described herein provide bar collimator and a backlight system configured to provide a collimated source of illumination to a backlight. In particular, a bar collimator is provided that includes a light guide configured to receive light at an end of the light guide and to guide the received light along a length of the light guide as guided light. The bar collimator further includes a diffraction grating disposed on a side of the light guide. According to various embodiments, the diffraction grating is configured to diffractively couple out a portion of the guided light and to direct the coupled-out portion toward an input of a backlight as a substantially collimated beam of light. The collimated beam of light or 'collimated light' has an extent corresponding to a length of the backlight input. The collimated beam may provide an illumination source of the backlight, according to some embodiments.

According to various embodiments, light from a light source (e.g., a plurality of LEDs) may be coupled into a bar collimator for collimation. According to some embodiments, the collimated light from the bar collimator may be coupled into a light guide of a backlight used in an electronic display. For example, the backlight may be a grating-based backlight including, but not limited to, a multibeam diffraction grating-based backlight. In some embodiments, the electronic display may be a three-dimensional (3D) or multiview electronic display used to display 3D information, e.g., as a 3D or multiview image. For example, the electronic display may be an autostereoscopic or 'glasses free' 3D electronic display.

In particular, a 3D electronic display may employ a grating-based backlight to provide illumination of a 3D or multiview image being displayed by the 3D electronic display. For example, the grating-based backlight may comprise a plurality of diffraction gratings configured to provide coupled-out light beams corresponding to pixels of the 3D electronic display (or equivalently of the 3D image). In various embodiments, the coupled-out light beams may have different principal angular directions (also referred to as 'the differently directed light beams') from one another. According to some embodiments, these differently directed light beams produced by the diffraction-grating based backlight may be modulated and serve as 3D pixels corresponding to 3D views of the 3D electronic display used to display the 3D information. In these embodiments, the light collimation provided by the bar collimator may be used to produce collimated light that is substantially uniform (i.e., without striping) within the diffraction grating-based backlight.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a bar guide and a strip guide.

Further herein, the term 'bar' when applied to a light guide as in a 'bar collimator' is defined as a three-dimensional column, which is sometimes referred to as a 'bar' guide. In particular, a bar collimator is defined as a light guide configured to guide light along a length bounded by a pair of opposing surfaces aligned in two substantially orthogonal directions (top, bottom, and two sides). According to various embodiments, top and bottom surfaces of the bar collimator light guide are substantially parallel to one another in at least a differential sense. Similarly, two other generally opposing sides are also substantially parallel to one another in at least a differential sense, according to various embodiments. That is, within any differentially small region or length of the bar collimator, opposing surfaces (e.g., top and bottom, a pair of sides, etc.) are substantially parallel to one another. In some embodiments, a bar collimator may be a substantially rectangular column having a length along which a top and a bottom are substantially parallel to one another and two sides also substantially parallel to one another, as discussed above.

According to various embodiments described herein, a diffraction grating may be employed to scatter or couple light out of a light guide (e.g., a bar collimator) as a light beam. Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the plurality of features (e.g., a plurality of grooves in a material surface) of the diffraction grating may be arranged in a one-dimensional (1-D) array. In other examples, the diffraction grating may be a two-dimensional (2-D) array of features. The diffraction grating may be a 2-D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating (i.e., diffracted light) generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from light guide.

Further, by definition herein, the features of a diffraction grating are referred to as 'diffractive features' and may be one or more of at, in and on a surface (i.e., wherein a 'surface' refers to a boundary between two materials). The surface may be a surface of a bar collimator, for example. The diffractive features may include any of a variety of structures that diffract light including, but not limited to, one or more of grooves, ridges, holes and bumps, and these structures may be one or more of at, in and on the surface. For example, the diffraction grating may include a plurality of parallel grooves in a material surface. In another example, the diffraction grating may include a plurality of parallel ridges rising out of the material surface. If the diffraction grating comprises parallel grooves, parallel ridges, etc. at a side surface, the diffraction grating comprises 'vertical' diffractive features that are parallel to one another (i.e., parallel vertical diffractive features), by definition herein. The diffractive features (whether grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

Herein, a 'light source' is defined as a source of light (e.g., an apparatus or device that emits light). For example, the light source may be a light emitting diode (LED) that emits light when activated. A light source herein may be substantially any source of light or optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by a light source may have a color or may include a particular wavelength of light. As such, a 'plurality of light sources of different colors' is explicitly defined herein as a set or group of light sources in which at least one of the light sources produces light having a color, or equivalently a wavelength, that differs from a color or wavelength of light produced by at least one other light source of the light source plurality. Moreover, the 'plurality of light sources of different colors' may include more than one light source of the same or substantially similar color as long as at least two light sources of the plurality of light sources are different color light sources (i.e., produce a color of light that is different between the at least two light sources). Hence, by definition herein, a plurality of light sources of different colors may include a first light source that produces a first color of light and a second light source that produces a second color of light, where the second color differs from the first color.

Further, as used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the terms 'substantially' and 'about,' as used herein, mean a majority, or almost all, or all, or an amount within a range of about 51% to about 100%. Moreover, examples herein are intended to be illustrative only and are presented for discussion purposes and not by way of limitation.

FIG. 1 illustrates a side view schematic diagram of a backlight system 100 according to an embodiment consistent with the principles described herein. In FIG. 1, backlight system 100 may include a bar collimator 105 disposed proximal a backlight 110. The bar collimator 105 comprises a light guide 107 and a diffraction grating 115 disposed on a side of the light guide 107. Further, diffraction grating 115 extends in the y-direction in a three-dimensional frame, e.g., as illustrated. In some embodiments (e.g., as illustrated), the diffraction grating 115 is on a side of the light guide 107 adjacent an input side 120 of the backlight 110 (i.e., a 'backlight-adjacent' side). In other embodiments, the diffraction grating 115 may be disposed on a side of the bar collimator 105 or equivalently on a side of the light guide 107 that is opposite the side adjacent to input side 120 of the backlight 110.

In certain embodiments, the light guide 107 of the bar collimator 105 is configured to receive light at an end (FIG. 2 at 150, 155) of the light guide 107. The end may be substantially orthogonal to the side upon which the diffraction grating 115 is disposed, as illustrated. The light beam may be received from a light source 140 or a plurality of light sources, e.g., light sources 140, 145. The light guide 107 is further configured to guide the received light along a length (from end-to-end) of the light guide 107 as guided light 139. The diffraction grating 115 of the bar collimator 105 is configured to diffractively couple out a portion of the guided light 139 and to direct the coupled-out portion of guided light 139 toward the input side 120 of the backlight 110 as a beam of collimated light 125. The collimated light 125 provides an illumination source for the backlight 110 and further has an extent corresponding to a length of the input side 120, according to various embodiments. In some embodiments, the backlight 110 also comprises a diffraction grating 135 to provide projected light 130 from the backlight 110 to illuminate a display, such as a 3D display or the like. For example, diffraction grating 135 may extend along an x-direction of the three-dimensional frame.

According to various embodiments, the light guide 107 is configured to guide the guided light 139 using total internal reflection. For example, the light guide 107 may include a dielectric material configured as an optical waveguide, the dielectric material having a refractive index that is greater than a refractive index of a medium surrounding the optical waveguide. A difference between refractive indices of the dielectric material and the surrounding medium facilitates total internal reflection of the guided light 139 within the bar collimator 105 according to one or more guided modes thereof. A non-zero propagation angle of the guided light 139 within the light guide 107 may correspond to an angle that is less than a critical angle for total internal reflection, according to various examples.

Figure 2:
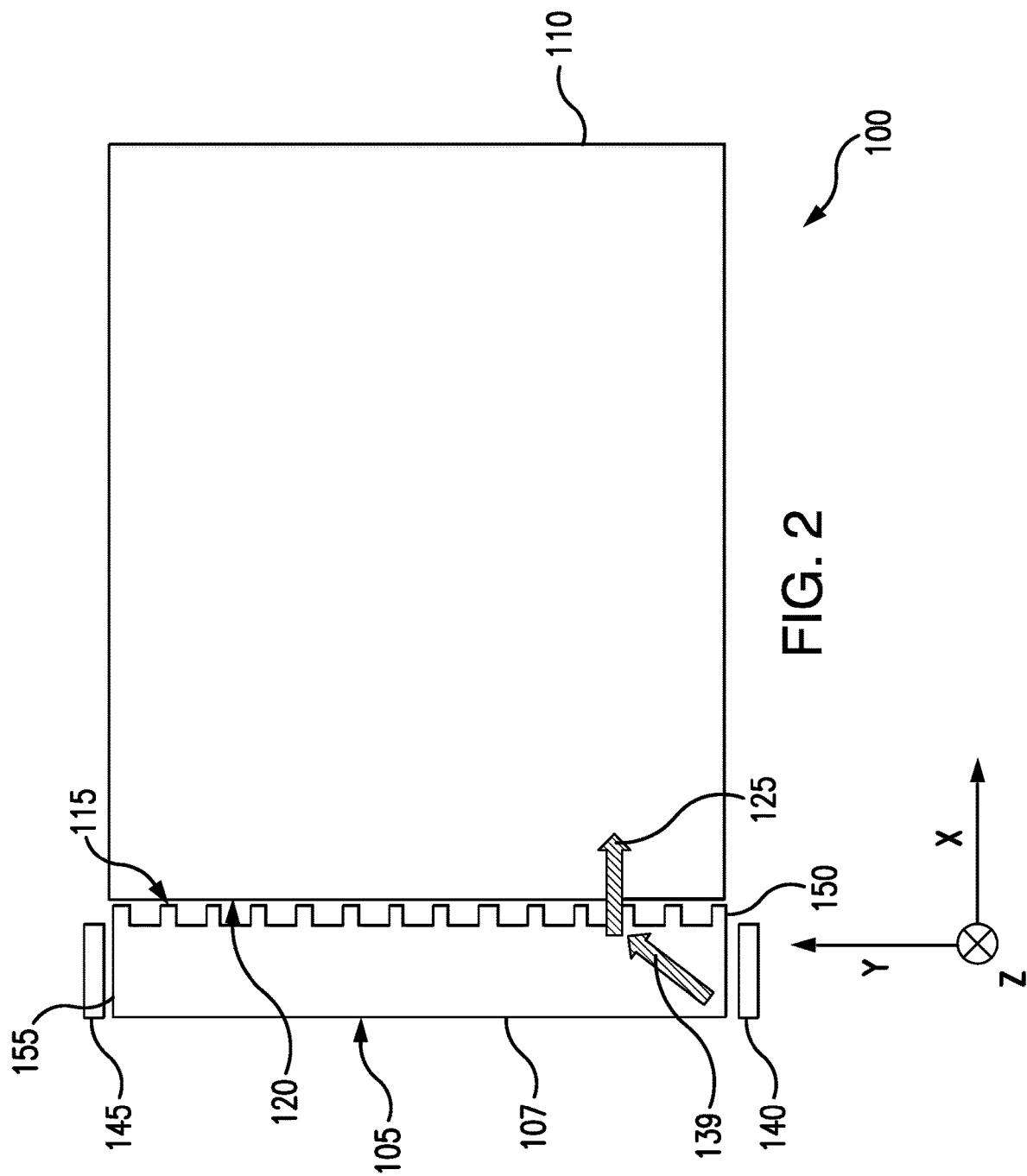
FIG. 2 illustrates a top view schematic diagram of the backlight system of FIG. 1 in an example, according to an embodiment consistent with the principles described herein.

In some examples, the light guide 107 may be a bar-shaped, column optical waveguide. The bar-shaped, column optical waveguide is a rectangular, bar-shaped column as illustrated in FIGS. 1 and 2. The substantially rectangular bar-shaped column of dielectric material is configured to guide the guided light 139 using total internal reflection. The optically transparent material of the light guide 107 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 107 may further include a cladding layer on at least a portion of a surface (e.g., the top surface and/or the bottom surface) of the light guide 107 (not illustrated). The cladding layer may be used to further facilitate total internal reflection, according to some examples.

Figure 3:
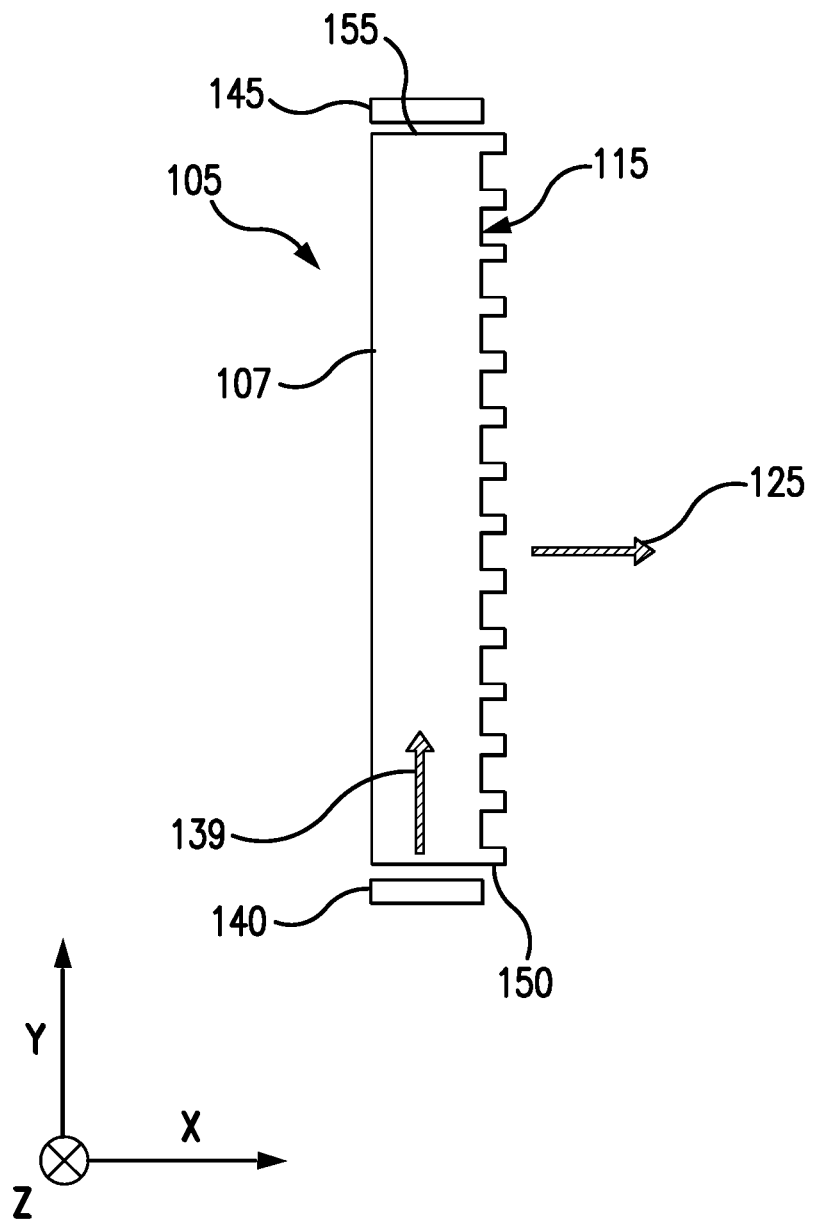
FIG. 3 illustrates a top view schematic diagram of a bar collimator system in an example, according to an embodiment consistent with the principles described herein.

Once introduced into the light guide 107, the guided light 139 propagates along the light guide 107 in a direction that is generally away from an input end(s) 150, 155 of light guide 107. In FIG. 3, propagation of the guided light 139 is illustrated as an arrow pointing along the y-direction and representing a propagating optical beam within the light guide 107. The propagating optical beam may represent one or more of the optical modes of the light guide 107, for example. The propagating optical beam of the guided light 139 generally propagates by 'bouncing' or reflecting off of the walls (top, bottom and sides) of the light guide 107 at an interface between the material (e.g., dielectric) of the light guide 107 and the surrounding medium due to total internal reflection, according to various examples. Bouncing or reflecting of the guided light 139 is not explicitly illustrated for simplicity of illustration.

FIG. 2 illustrates a top view schematic diagram of the backlight system 100 of FIG. 1 in an example, according to an embodiment consistent with the principles described herein. In FIG. 2, the backlight system 100 may also include a 'first' light source 140. In some embodiments the backlight system 100 further includes another or 'second' light source 145. The second light source 145 may be included to provide additional light and thus increase an intensity of light provided to and totally internally reflected (i.e., guided light intensity) within the bar collimator 105 as the guided light 139. In some embodiments, one or both of these light sources 140, 145 may comprise a light emitting diode (LED) such as, but not limited to, a white LED, disposed adjacent and proximal to the bar collimator 105 including the light guide 107. For example, the first light source 140 may be disposed adjacent a first end at 150 of the bar collimator 105, e.g., as shown in FIG. 2. Further, the second light source 145, when present, may be disposed adjacent a second end at 155 of the bar collimator 105, e.g., as is also shown in FIG. 2. Such a configuration may allow the bar collimator 105 and light guide 107 to totally internally reflect the emitted light from one or the other or both light sources 140, 145 within the light guide 07. The guided light 139 within the light guide 107 may be diffractively coupled out as collimated light 125 via diffraction grating 115 of the bar collimator 105 and into the backlight 110 at input side 120, as shown in FIG. 2. In certain embodiments, the input side 120 extends the length of bar collimator 105 and diffraction grating 115 (e.g., in the y-direction, as illustrated).

FIG. 3 illustrates a top view schematic diagram of a bar collimator 105 in an example, of according to an embodiment consistent with the principles described herein. In FIG.

3, bar collimator 105 comprises a light guide 107 and a diffraction grating 115 disposed along a length of the bar collimator 105 (e.g., in the y-direction, as illustrated). The diffraction grating 115 is configured to diffractively couple out light as the collimated light 125 of the bar collimator 105 in the x-direction towards the backlight 110, as discussed above.

According to some examples, the diffraction grating 115 may include a chirped diffraction grating. By definition, the 'chirped' diffraction grating is a diffraction grating exhibiting or having a diffraction grating pitch or spacing of the diffractive features that varies across an extent or length of the chirped diffraction grating. Herein, the varying diffraction spacing is referred to as a 'chirp'. As a result of the chirp, the guided light 139 that is diffractively coupled out of the light guide 107 exits or is emitted from the chirped diffraction grating as the collimated light 125 beam at different diffraction angles corresponding to different points of origin across the chirped diffraction grating.

In some examples, the chirped diffraction grating may have or exhibit a chirp of the diffractive spacing that varies linearly with distance. As such, the chirped diffraction grating may be referred to as a 'linearly chirped' diffraction grating. In another example, the chirped diffraction grating may exhibit a non-linear chirp of the diffractive spacing. Various non-linear chirps that may be used to realize the chirped diffraction grating include, but are not limited to, an exponential chirp, a logarithmic chirp or a chirp that varies in another, substantially non-uniform or random but still substantially monotonic manner. Non-monotonic chirps such as, but not limited to, a sinusoidal chirp or a triangle (or sawtooth) chirp, may also be employed. Combinations of any of these types of chirps may also be employed.

In some embodiments (e.g. as illustrated in FIGS. 1-3), the diffraction grating 115 is disposed on a side of the light guide 107 adjacent to the backlight 110. In these embodiments, the diffraction grating 115 may comprise a transmission mode diffraction grating. The diffraction grating 115 comprising the transmission mode diffraction grating is configured, by definition herein, to diffractively couple out a portion of the guided light 139 directly through the side of the light guide 107 adjacent to the backlight 110 (i.e., backlight-adjacent side).

Figure 4A:
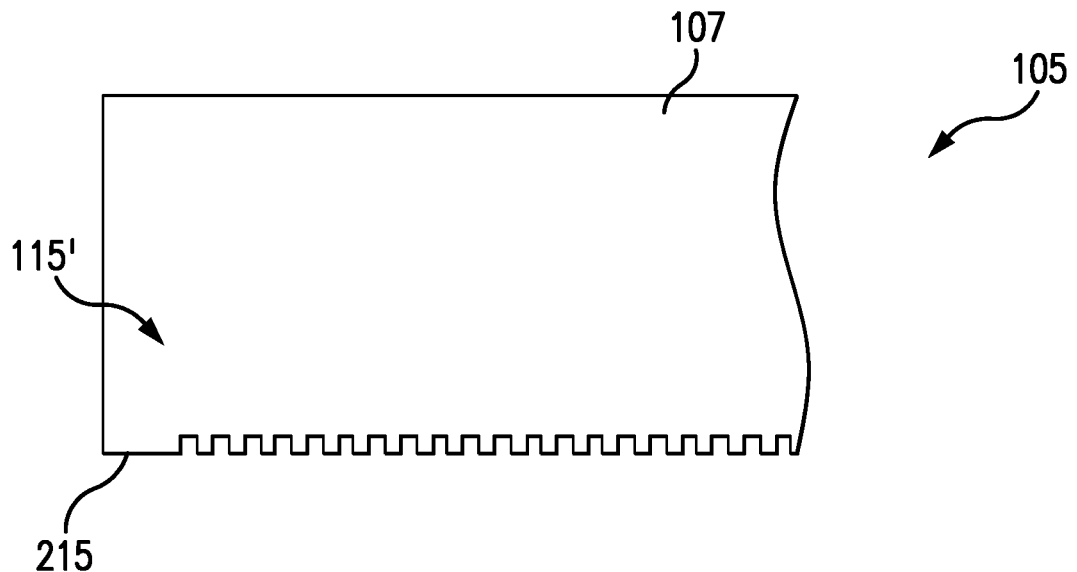
FIG. 4A illustrates a cross sectional view of a portion of a bar collimator in an example, according to an embodiment consistent with the principles described herein.
Figure 4B:
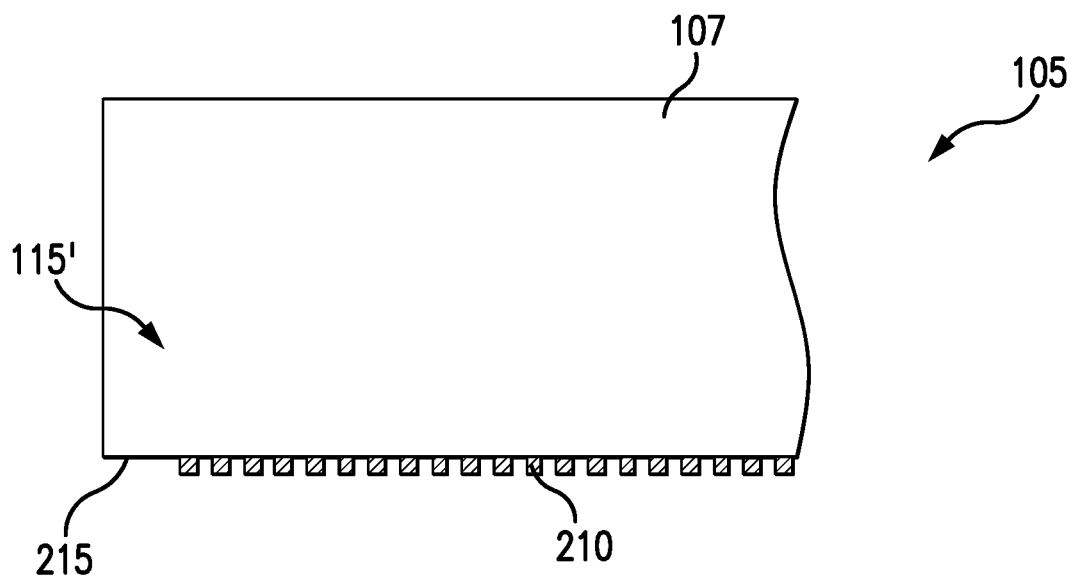
FIG. 4B illustrates a cross sectional view of a portion of a bar collimator in an example, according to another embodiment consistent with the principles described herein.

FIG. 4A illustrates a cross sectional view of a portion of a bar collimator 105 in an example, according to an embodiment consistent with the principles described herein. FIG. 4B illustrates a cross sectional view of a portion of a bar collimator 105 in an example, according to another embodiment consistent with the principles described herein. In particular, both FIGS. 4A and 4B illustrate a portion of a bar collimator 105 that includes a transmission mode diffraction grating 115' on a light guide surface (e.g., as illustrated in FIGS. 1-3). As illustrated, the transmission mode diffraction grating 115' is located on the backlight-adjacent surface of the light guide 107. Note, the backlight (e.g., backlight 110 of FIGS. 1 and 2) is omitted in FIGS. 4A-4B, but would be located below the bar collimator 105 where it to be illustrated.

In particular, as illustrated in FIG. 4A, the transmission mode diffraction grating 115' includes grooves (i.e., diffractive features) formed in a surface 215 of a side of the light guide 107. The side surface 215 is the backlight-adjacent side of the light guide 107, as illustrated in FIG. 4A. For example, the light guide 107 may include a glass or a plastic/polymer sheet with grooves formed in the backlight-adjacent side thereof.

FIG. 4B illustrates a transmission mode diffraction grating 115' that includes ridges (i.e., diffractive features) of a grating material 210 on the backlight-adjacent side surface 215 of the light guide 107. Etching or molding a deposited layer of the grating material 210, for example, may produce the ridges. In some examples, the grating material 210 that makes up the ridges illustrated in FIG. 4B may include a material that is substantially similar to a material of the light guide 107. In other examples, the grating material 210 may differ from the material of the light guide 107. For example, the light guide 107 may include a glass or a plastic/polymer material and the grating material 210 may comprise a material such as, but not limited to, silicon nitride. In FIG. 4B, the grating material 210 is also optically transparent, according to some embodiments.

In other embodiments, the diffraction grating 115 may be disposed on a side of the light guide 107 opposite to the backlight-adjacent side surface 215 (or equivalently the backlight-adjacent side). In these embodiments, the diffraction grating 115 may configured as a reflection mode diffraction grating and thus be referred to as a 'reflective' diffraction grating 115". As a reflection mode diffraction grating, the reflective diffraction grating 115" is configured to diffractively redirect a portion of the guided light 139 and reflect the diffractively redirected portion through the light guide 107 and out of the backlight-adjacent side surface 215 toward the backlight 110. As such, the guided light portion is diffractively coupled out by both diffractive redirection and reflection using the reflective diffraction grating 115".

Figure 5A:
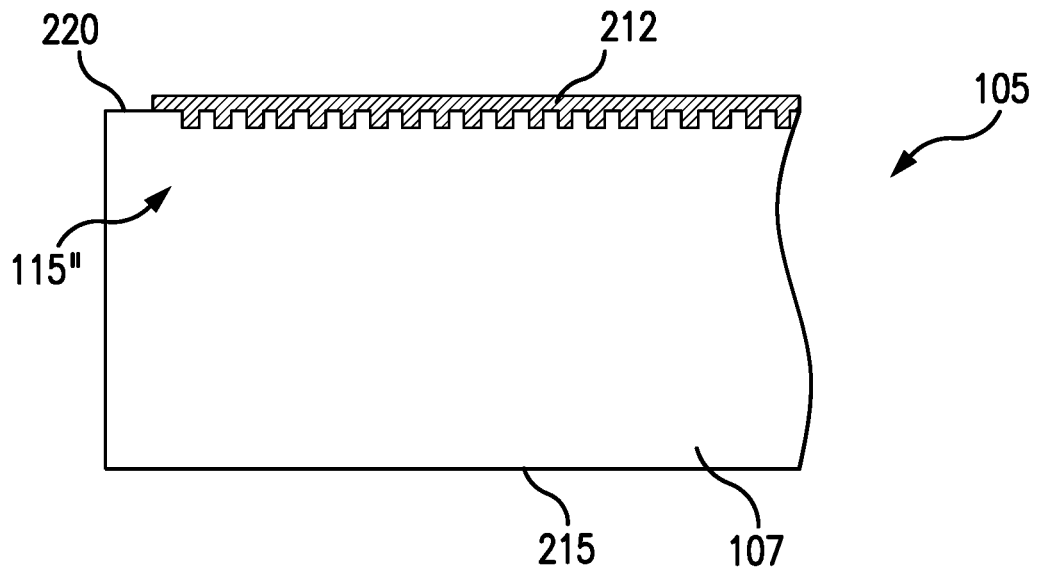
FIG. 5A illustrates a cross sectional view of a portion of a bar collimator in an example, according to another embodiment consistent with the principles described herein.
Figure 5B:
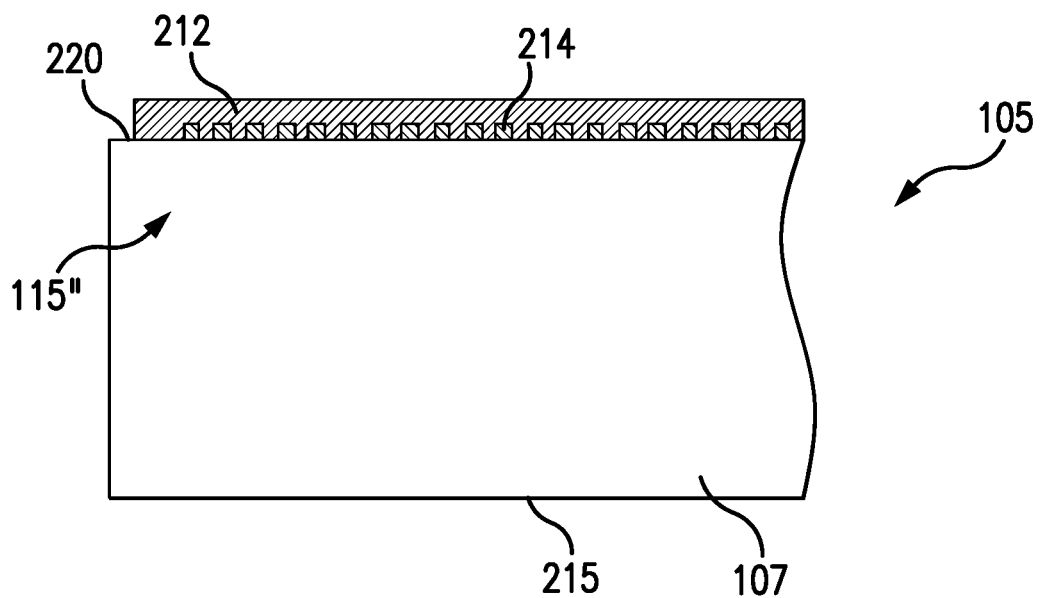
FIG. 5B illustrates a cross sectional view of a portion of a bar collimator in an example, according to yet another embodiment consistent with the principles described herein.

FIG. 5A illustrates a cross sectional view of a portion of a bar collimator 105 in an example, according to another embodiment consistent with the principles described herein. FIG. 5B illustrates a cross sectional view of a portion of a bar collimator 105 in an example, according to yet another embodiment consistent with the principles described herein. In particular, both FIGS. 5A and 5B illustrate a portion of the bar collimator 105 that includes a reflective diffraction grating 115" configured as a reflection mode diffraction grating. As illustrated, the reflective diffraction grating 115" is at or on a surface 220 of the light guide 107 opposite the backlight-adjacent side surface 215. Note, the backlight (e.g., the backlight 110 of FIGS. 1 and 2) is omitted in FIGS. 5A-5B, but would be located below the illustrated bar collimator 105 where it to be illustrated.

In FIG. 5A, the reflective diffraction grating 115" includes grooves (diffractive features) formed in the surface 220 of the light guide 107 to reflectively diffract and redirect a portion of the guided light 139 back through the light guide 107 and out of the backlight-adjacent side surface 215. As illustrated, the grooves are filled with and further backed by a reflective material layer 212 comprising a metal or similar reflective material to provide additional reflection and improve a diffractive efficiency, for example. In other words, the reflective diffraction grating 115" includes the reflective material layer 212, as illustrated. In other examples (not illustrated), the grooves may be filled with a grating material (e.g., silicon nitride) and then backed or substantially covered by the reflective material layer 212.

FIG. 5B illustrates a reflective diffraction grating 115" that includes ridges (diffractive features) formed of a grating material 214 on the surface 220 of the light guide 107 to create the reflection mode diffraction grating. The ridges may be etched from a layer of the grating material 214 (e.g., silicon nitride, for example. In some examples (e.g., as illustrated), the reflective diffraction grating 115" is backed by the reflective material layer 212 to substantially cover the ridges of the reflective diffraction grating 115″ to provide increased reflection and improve the diffractive efficiency, for example.

Figure 6:
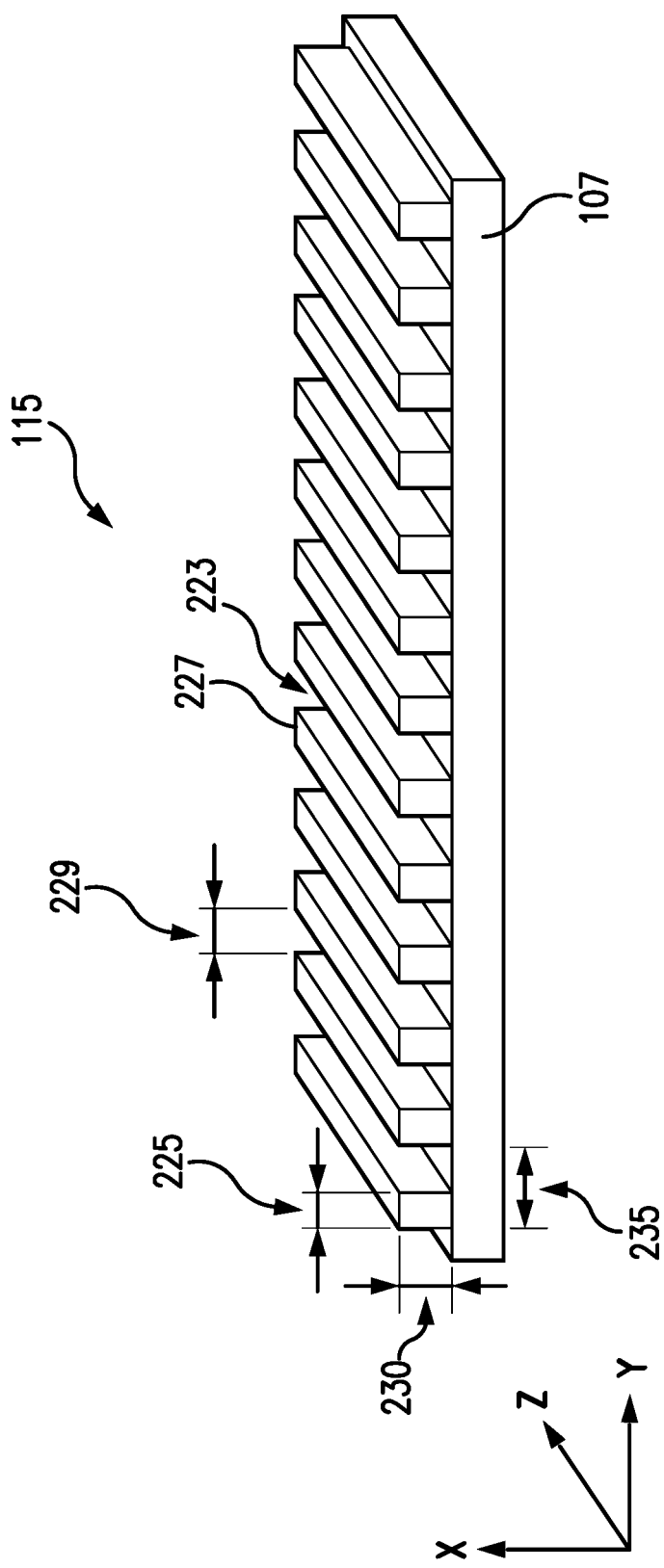
FIG. 6 illustrates a schematic view of a diffraction grating in an example, according to an embodiment consistent with the principles described herein.

FIG. 6 illustrates a schematic view of a diffraction grating 115 in an example, according to an embodiment consistent with the principles described herein. In FIG. 6, diffraction grating 115 disposed on a surface of the light guide 107. The structure of the diffraction grating 115 may include grating properties along a y-direction of the bar collimator 105 such as a groove width 229 of a groove 223 disposed between a pair of ridges 227 of the diffraction grating 115 along with a ridge width 225 of a ridge 227 of the pair. Additional grating properties include, but are not limited to, a grating depth 230, a grating period 235, and grating duty cycle. The 'grating duty cycle' may be defined as the ratio of ridge width 225 of the ridges 227 to groove width 229 of the grooves 223. In some embodiments, these elements may be varied to provide a non-uniform pitch and to vary diffraction angles.

In some embodiments (not illustrated), grating depth 230 (e.g., groove depth) may change or be varied along the y-direction to vary diffractive strength. Thus, in certain embodiments, not only may the diffraction grating 115 have a chirp or other feature spacing variation along the length of the diffraction grating 115 to optimize or control a shape of the out-coupled or beam of collimated light 125, but also one or both of the diffraction grating duty cycle and grating depth 230 may be varied along the y-direction to further control or adjust characteristics of the light beam that is coupled out. In particular, changing 'diffractive strength' (i.e., how strong the coupled-out portion is at any point along the grating) using grating depth 230 may be used to adjust for a decrease in an intensity of the guided light 139 propagating within the light guide 107 of the bar collimator 105 as a function of propagation distance.

In certain embodiments, (see FIG. 3) diffraction grating 115 may extract light from the bar collimator 105 without changing light distribution. Instead only the light propagation direction may be changed, e.g., from the y-direction to the x-direction as illustrate in FIG. 3 (i.e., at 139 and 125, respectively. For example, the internally reflected or guided light 139 in bar collimator 105 may include substantially a 45° cone while propagating within the light guide 107 of the bar collimator 105. When the guided light portion is diffractively coupled out via the diffraction grating 115, only one side or about half of the 45° cone (i.e., about ±22.5°) will interact with the diffraction grating structural side of the bar collimator 105. The light that is diffractively coupled out changes direction but may maintain the light distribution of the substantially 45° cone of light, for example. Thus, the light coupled out from the bar collimator 105 will be about half of the substantially 45° cone in this example or about 22.5°.

Figure 7:
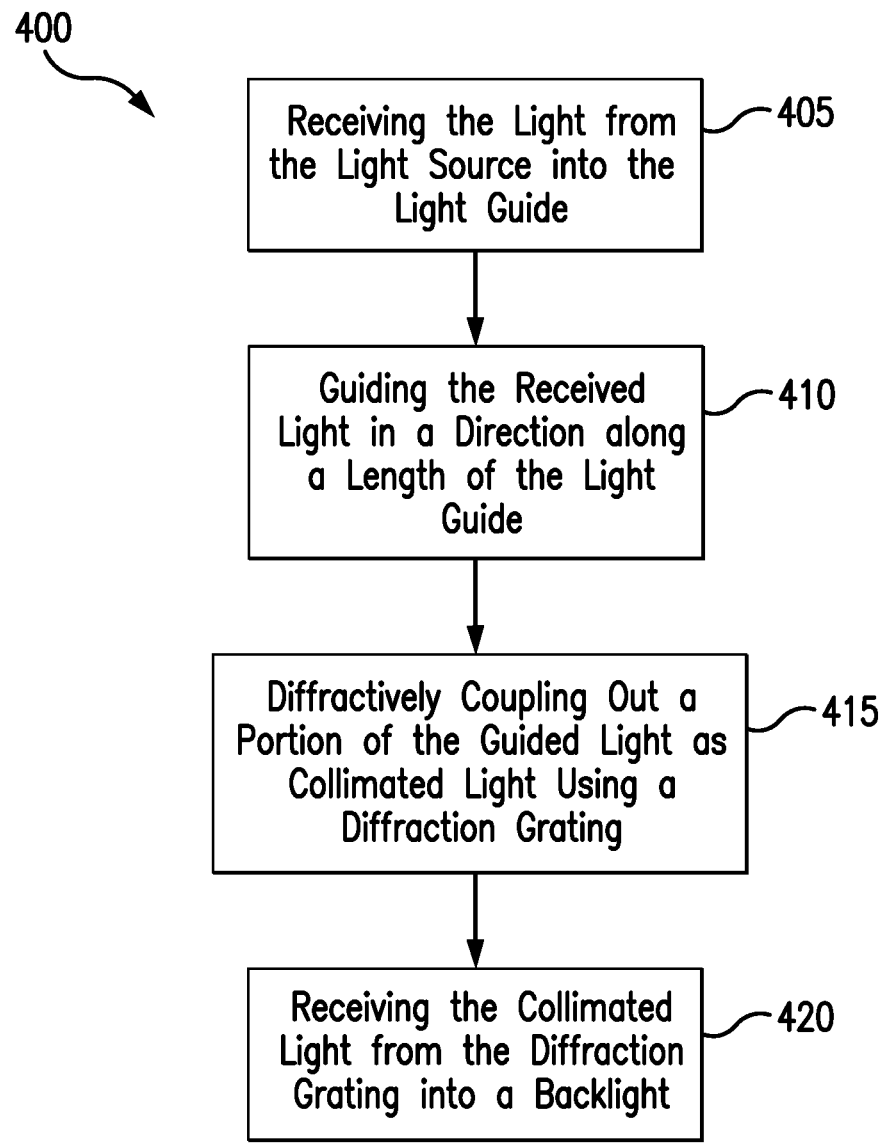
FIG. 7 illustrates a flowchart of a method of collimating light to provide backlight illumination in an example, according to an embodiment consistent with the principles described herein.

FIG. 7 illustrates a flowchart of a method 400 of collimating light to provide backlight illumination in an example, according to an embodiment consistent with the principles described herein. In FIG. 7, method 400 of collimating light comprises: 405 receiving the light from the light source(s) into a light guide; 410 guiding the received light in a direction along a length of the light guide; 415 diffractively coupling out a portion of the guided light as collimated light using a diffraction grating. The method 400 further comprises 420 receiving the collimated light from the diffraction grating into a backlight.

In some embodiments (not illustrated), a lens may be included in the backlight system, e.g., the backlight system 100 illustrated in FIGS. 1 and 2. The lens may be disposed between the light source(s) 140, 145 and the light guide. The lens may be configured to assist in focusing the emitted light from the light source(s) 140, 145, for example. In other embodiments (not illustrated), a lens may be disposed along the length of the light guide 107 between the backlight 110 and the light guide. This lens may be configured to assist in focusing the emitted light (i.e., collimated light 125) from the light guide 107, for example.

Thus, there have been described examples of a bar collimator, a backlight system, and a method of collimating light that employ a diffraction grating to couple light out of a light guide of the bar collimator. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A bar collimator, comprising:
a light guide of the bar collimator configured to receive light at an end of the light guide and to guide the received light along a length of the light guide as guided light; and
a diffraction grating of the bar collimator disposed on a side of the light guide, the diffraction grating being configured to diffractively couple out a portion of the guided light and to direct the coupled-out portion toward an input of a backlight as a collimated beam of light,
wherein the collimated beam of light has an extent corresponding to a length of the backlight input, the collimated beam being an illumination source of the backlight.

2. The bar collimator of claim 1, wherein the diffraction grating comprises a plurality of diffractive features disposed along the length of the light guide, and wherein the coupled-out portion directed toward the backlight is configured to be uniform along the length of the backlight.

3. The bar collimator according to claim 2, wherein the plurality of diffractive features extend from a first surface to a second surface of the bar collimator, the first and second surfaces being parallel to one another and perpendicular to the side.

4. The bar collimator of claim 1, wherein the side of the light guide along which the diffraction grating is disposed is adjacent to the backlight, the diffraction grating comprising a transmission mode diffraction grating.

5. The bar collimator of claim 1, wherein the diffraction grating comprises a reflection mode diffraction grating disposed on a side of the light guide opposite to a side adjacent to the backlight.

6. The bar collimator according to claim 1, wherein the diffraction grating comprises a chirped diffraction grating.

7. The bar collimator according to claim 1, wherein the diffraction grating comprises one or both of a duty cycle and a grating depth configured to vary along a length of the diffraction grating.

8. A backlight system, comprising:
a light source configured to provide light;
a light guide configured to guide light received from the light source as guided light, the light guide being disposed proximal to the light source;
a diffraction grating configured to diffractively couple out a portion of the guided light from the light guide as collimated light; and a backlight adjacent to the light guide, the backlight being configured to receive the collimated light from the diffraction grating, wherein the diffraction grating is disposed along a side of the light guide and the light source is adjacent to an end of the light guide.

9. The backlight system of claim 8, wherein the side of the light guide along which the diffraction grating is disposed is adjacent to the backlight, the diffraction grating comprising a transmission mode diffraction grating.

10. The backlight system of claim 8, wherein the diffraction grating comprises a reflection mode diffraction grating disposed on a side of the light guide opposite to a side adjacent to the backlight.

11. The backlight system of claim 8, further comprising a lens disposed along a length of the light guide between the backlight and the light guide.

12. The backlight system of claim 8, further comprising a lens disposed between the light source and the light guide.

13. The backlight system of claim 8, further comprising another light source disposed proximal to a second distal end of the light guide, wherein the other light source is configured to provide additional light to the light guide to increase an intensity of the guided light within the light guide.

14. The backlight system of claim 13, wherein one or both of the light sources comprises a light emitting diode.

15. A method of collimating light to provide backlight illumination, the method comprising:

receiving light from a first light source using a light guide;

guiding the received light in a direction away from the first light source along a length of the light guide as guided light; and diffractively coupling out a portion of the guided light towards a backlight of a display as collimated light using a diffraction grating, wherein the diffraction grating is disposed along a side of the light guide and the first light source is adjacent to an end of the light guide, and wherein the collimated light has an extent corresponding to a length of a backlight input of the backlight configured to receive the collimated light.

16. The method of claim 15, further comprising:

receiving the collimated light from the diffraction grating by the backlight adjacent to the light guide, the collimated light being received at the backlight input.

17. The method of claim 15, wherein the diffraction grating is a transmission mode diffraction grating disposed along a side of the light guide adjacent to the backlight input, and wherein the portion of the guided light is diffractively coupled out through the side of the light guide adjacent to the backlight input.

18. The method of claim 15, wherein the diffraction grating is a reflection mode diffraction grating disposed along a side of the light guide opposite to a side adjacent to the backlight input.

19. The method of claim 15, further comprising one or both of:

focusing the light from the light source to the light guide using a lens disposed between the first light source and the light guide; and focusing the collimated light using a lens disposed along the length of the light guide between the backlight and the light guide.

20. The method of claim 15, further comprising:

providing light by a second light source adjacent to an end of the light guide opposite to the end adjacent to the first light source.

* * * * *